(12) United States Patent
Woo (10) Patent No.: US 11,611,176 B2
(45) Date of Patent: Mar. 21, 2023

(54) STRUCTURE FOR PREVENTING CONNECTOR FROM BEING DETACHED FROM ELECTRONIC COMPONENTS IN VEHICLES

(71) Applicant: HYUNDAI MOBIS CO., LTD., Seoul (KR)

(72) Inventor: Myeong Nam Woo, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/317,192

(22) Filed: May 11, 2021

(65) Prior Publication Data

US 2021/0359467 A1 Nov. 18, 2021

(30) Foreign Application Priority Data

May 15, 2020 (KR) .................. 10-2020-0058361

(51) Int. Cl.
*H01R 13/639* (2006.01)
*B60R 16/023* (2006.01)

(52) U.S. Cl.
CPC .......... *H01R 13/639* (2013.01); *B60R 16/023* (2013.01); *H01R 2201/26* (2013.01)

(58) Field of Classification Search
CPC .............. H01R 13/648; H01R 13/6485; H01R 13/658; H01R 13/629; H01R 13/639; H01R 12/596
See application file for complete search history.

(56) References Cited

U.S. PATENT DOCUMENTS

| | | | | |
|---|---|---|---|---|
| 4,885,429 A * | 12/1989 | Schnittker | ............ | H02G 3/0691 439/98 |
| 4,936,795 A * | 6/1990 | Kawai | ................ | H01R 13/6594 439/95 |
| 4,938,710 A * | 7/1990 | Aihara | ................. | H01R 13/639 439/345 |
| 5,017,158 A * | 5/1991 | Liu | ...................... | H01R 13/658 439/607.23 |
| 5,052,948 A * | 10/1991 | Hyzin | ................ | H01R 13/6582 29/874 |
| 5,637,014 A * | 6/1997 | Sukegawa | .............. | H01R 12/00 439/607.4 |
| 6,004,163 A * | 12/1999 | Behling | ............... | H01R 13/514 439/701 |

(Continued)

*Primary Examiner* — Thanh Tam T Le
(74) *Attorney, Agent, or Firm* — DLA Piper LLP (US)

(57) ABSTRACT

A structure for preventing a connector from being detached from an electronic component of a vehicle is provided. The structure includes a fixing clip member fixing the connector to a connector inserting groove. The fixing clip member includes a first stopper acting as a hanging jaw so that the fixing clip member is not detached from the connector inserting groove in a state which is mounted in a mounting groove formed in the connector inserting groove, in a process of inserting the fixing clip member to be inserted into the connector inserting groove and a second stopper mounted in a stopper hanging groove formed in a front end portion of the connector to act as a hanging jaw fixing the connector so that the connector is not detached from the connector inserting groove, in a process of inserting the connector into the connector inserting groove.

4 Claims, 12 Drawing Sheets

(56) References Cited

U.S. PATENT DOCUMENTS

| | | | | |
|---|---|---|---|---|
| 7,341,286 B2* | 3/2008 | Andre | ............... | F16L 37/091 |
| | | | | 285/104 |
| 7,488,905 B2* | 2/2009 | Kiely | ............... | H01R 13/741 |
| | | | | 174/650 |
| 8,147,272 B2* | 4/2012 | Rhein | ............... | H01R 13/5202 |
| | | | | 439/556 |
| 8,287,297 B2* | 10/2012 | Schmidt | ............... | H01R 13/631 |
| | | | | 439/345 |
| 8,333,613 B2* | 12/2012 | De Chazal | ............... | H01R 13/6581 |
| | | | | 439/607.01 |
| 10,593,445 B2* | 3/2020 | Gretz | ............... | H02G 3/06 |

\* cited by examiner

DETACHMENT DIRECTION

FIG. 12D

STRUCTURE FOR PREVENTING CONNECTOR FROM BEING DETACHED FROM ELECTRONIC COMPONENTS IN VEHICLES

CROSS-REFERENCE TO RELATED APPLICATIONS

This application claims priority under 35 U.S.C. § 119 to Korean Patent Application No. 10-2020-0058361, filed on May 15, 2020, the disclosure of which is incorporated herein by reference in its entirety.

TECHNICAL FIELD

The present invention relates to a structure for preventing a connector from being detached from electronic components in vehicles.

BACKGROUND

Canada and some European countries have enacted laws and regulations for preventing an illegal action where a vehicle thief detaches a connector from a vehicle electronic component such as a body control module (BCM) or an integrated body control unit (IBU) associated with starting a vehicle engine and attempts hacking by using a cable connected to the detached connector.

In addition to Canada and some European countries, in Korea where the laws and regulations are not enacted, various vehicle theft prevention structures developed for preventing vehicle theft are equipped in vehicle electronic components.

A vehicle theft prevention structure of the related art is referred to as a safety bracket, and a safety bracket of the related art is mounted on a mounting bracket installed in an IBU housing or a BCM housing.

A structure of the mounting bracket differs based on the kinds of vehicles due to a limited package problem, and moreover, differs despite the same vehicles. Due to this, it is actually difficult to share the mounting bracket in common.

In a current situation where a safety bracket should be mounted on the mounting bracket difficult to share, because a structure of the safety bracket should be changed when the structure of the mounting bracket is changed, it is actually difficult to share the safety bracket in common.

SUMMARY

Accordingly, the present invention provides a structure which has a structure irrelevant to a limited package and prevents a connector from being detached from an electronic component of a vehicle, in order to be applied to various kinds of vehicles.

In one general aspect, a structure for preventing a connector from being detached from an electronic component of a vehicle includes a fixing clip member fixing the connector to a connector inserting groove, wherein the fixing clip member includes: a first stopper acting as a hanging jaw so that the fixing clip member is not detached from the connector inserting groove in a state which is mounted in a mounting groove formed in the connector inserting groove, in a process of inserting the fixing clip member to be inserted into the connector inserting groove; and a second stopper mounted in a stopper hanging groove formed in a front end portion of the connector to act as a hanging jaw fixing the connector so that the connector is not detached from the connector inserting groove, in a process of inserting the connector into the connector inserting groove.

In another general aspect, a structure for preventing a connector from being detached from an electronic component of a vehicle includes a fixing clip member fixing the connector to a connector inserting groove, wherein the fixing clip member is mounted in a mounting groove formed in a front end portion of the connector and includes a plurality of stoppers mounted in a stopper hanging groove formed in the connector inserting groove to act as a hanging jaw so that the connector is not detached from the connector inserting groove, in a process of inserting the fixing clip member, mounted in the mounting groove of the connector, into the connector inserting groove.

Other features and aspects will be apparent from the following detailed description, the drawings, and the claims.

DETAILED DESCRIPTION OF EMBODIMENTS

Hereinafter, exemplary embodiments of the present invention will be described in detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to one of ordinary skill in the art. In the drawings, the dimensions of layers and regions are exaggerated or reduced for clarity of illustration. For example, a dimension and thickness of each element in the drawings are arbitrarily illustrated for clarity, and thus, embodiments of the present invention are not limited thereto. In addition, all conditional terms listed herein and understood that the embodiments are intended only for the purpose of, in principle, to understand the concept of the present invention is clearly not limited to the embodiment and state specifically enumerated.

The terms described herein are used for the purpose of describing the present invention, and are not used for limiting a meaning or the scope of the present invention described in claims.

In the following description, the technical terms are used only for explain a specific exemplary embodiment while not limiting the present invention. The terms of a singular form may include plural forms unless referred to the contrary. The meaning of 'comprise', 'include', or 'have' specifies a property, a region, a fixed number, a step, a process, an element and/or a component but does not exclude other properties, regions, fixed numbers, steps, processes, elements and/or components.

Figure 1:
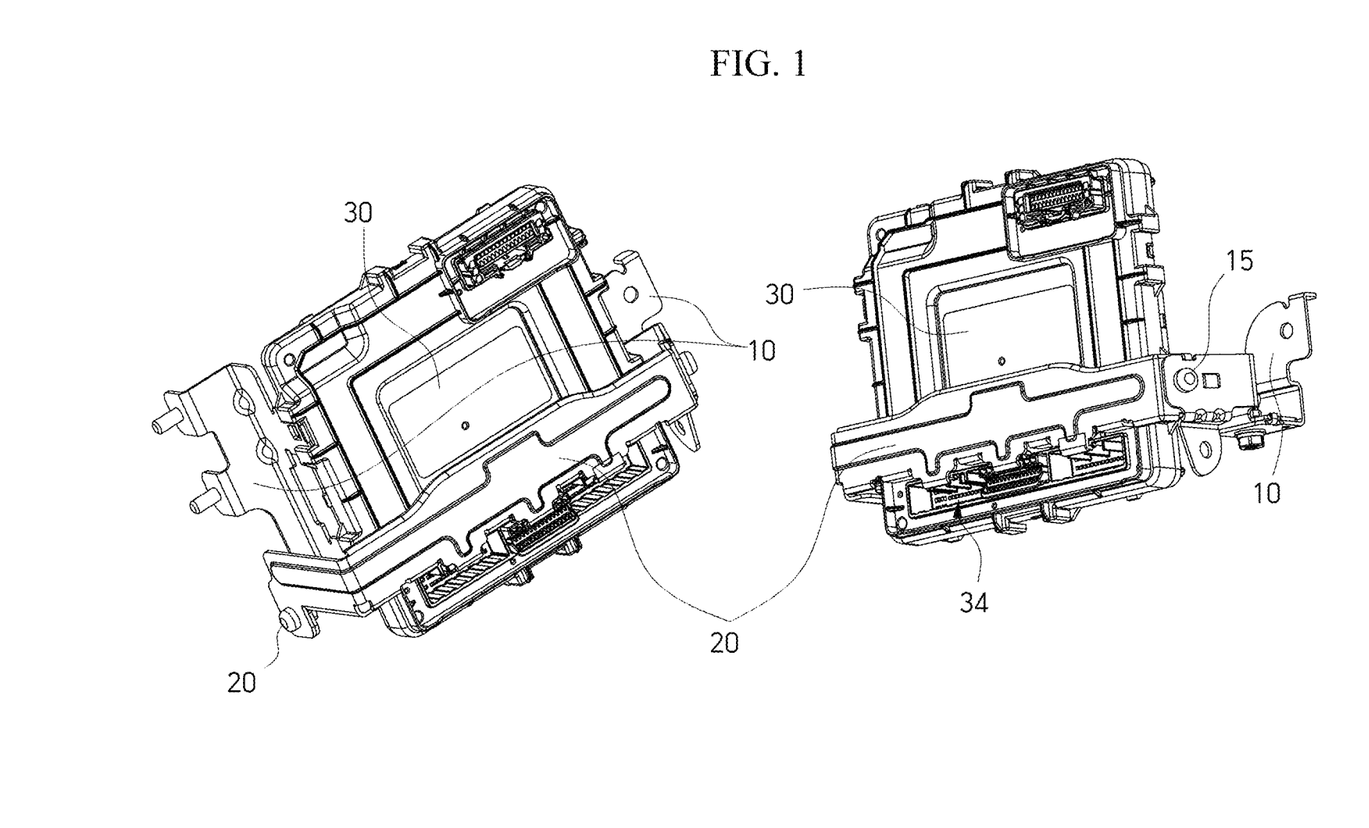
FIGS. 1 and 2 are diagrams for describing a mounting bracket and a safety bracket of the related art for helping understand the present invention.
Figure 2:
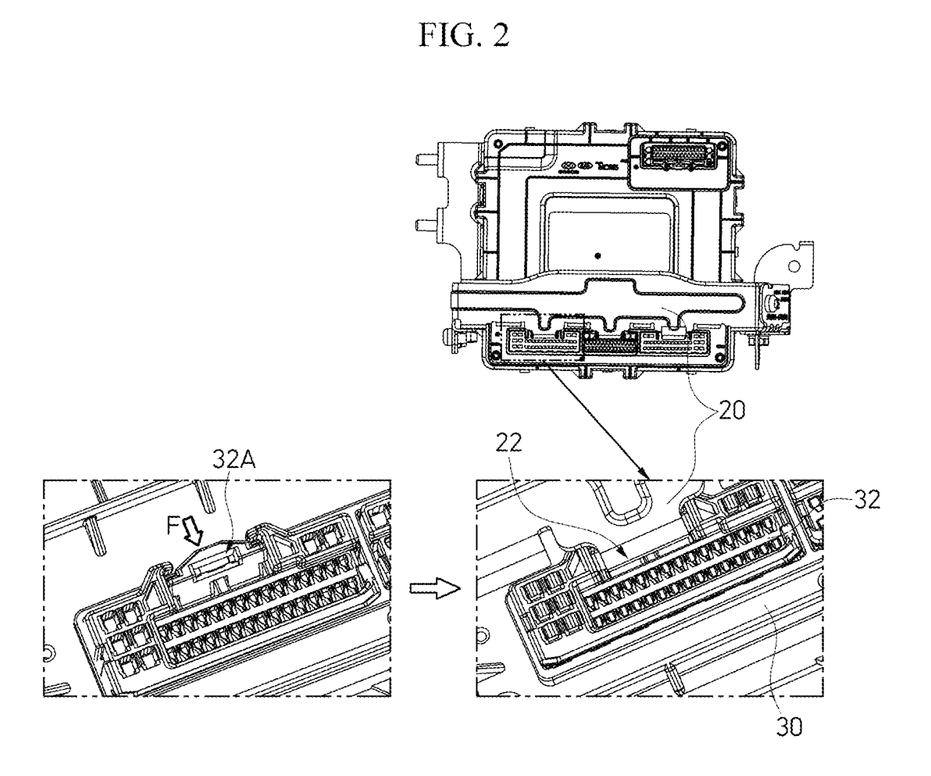

FIGS. 1 and 2 are diagrams for describing a mounting bracket and a safety bracket of the related art for helping understand the present invention.

Referring to FIG. 1, an electronic component 30 may be coupled to a mounting bracket 10 which is mounted at an internal specific position of a vehicle. In this case, the electronic component 30 may be an IBU or a BCM which controls an engine start function of a vehicle.

A safety bracket 20 of the related art may prevent a connector (32 of FIG. 2) from being detached from the electronic component 30 (or a housing configuring an electronic component) in a state which is fixed to the mounting bracket 10 by a front end bolt 15.

The front end bolt 15 may have a structure where a bolt head is not provided, and thus, because a vehicle thief is unable to release a bolt, it may be impossible to detach the safety bracket 20 from the mounting bracket 10.

A connector inserting part 34 with the connector 32 inserted (coupled thereto) thereinto may be molded in a housing which covers elements (circuit components and a printed circuit board (PCB) with the circuit components mounted thereon) of the electronic component 30.

The safety bracket 20 of the related art may be molded to surround a housing front surface and both side surfaces of the electronic component 30 in a band shape (a ⊏-shape) at a position which does not obstruct an exposure of an upper portion of the connector inserting part 34.

Moreover, a hook 22 having a hook shape may be molded at a center of the safety bracket 20 of the related art, and the molded hook 22 may be coupled to a hook coupling part 32A which is molded at an upper end of the connector 32.

In order to detach a connector, as illustrated in FIG. 2, when the hook coupling part 32A is deformed by applying a force in an F direction, it may be possible to detach the connector 32, but because a hook of the safety bracket 20 of the related art and the hook coupling part 32A of the connector 32 are coupled to each other in a hook coupling structure, there may be no space for deforming the hook coupling part 32A.

That is, it may be impossible to deform the hook coupling part 32A by using the safety bracket 20, and thus, the detachment of the connector 32 may be prevented.

However, because the safety bracket 20 of the related art has a structure which surrounds the housing front surface and the both side surfaces of the electronic component 30 in a band shape (a ⊏-shape), when a housing size of the electronic component 30 varies, the safety bracket 20 of the related art should be again manufactured through new molding on the basis of the variation, and even when a structure of the mounting bracket 10 is changed, the safety bracket 20 of the related art should be again manufactured based on the change every time.

The present invention may propose a new structure for preventing a connector from being detached from an electronic component of a vehicle so as to solve the problems of the related art and will be described below in detail.

A new structure for preventing a female connector from being detached from an electronic component of a vehicle according to the present invention may be configured to include a small fixing clip member.

Embodiments of the present invention will be described below in detail. However, a fixing clip member may be assembled (fastened to or mounted in) with a connector inserting groove which acts as a male connector in an electronic component of a vehicle, or may be assembled (fastened to or mounted in) with a female connector inserted into the connector inserting groove.

The fixing clip member of the present invention may prevent the female connector from being detached (removed) from the connector inserting groove in a state which is assembled with the connector inserting groove or assembled with the female connector.

Hereinafter, various embodiments of a structure for preventing the female connector from being detached from an electronic component of a vehicle by using the fixing clip member will be described in detail.

First Embodiment

Figure 3:
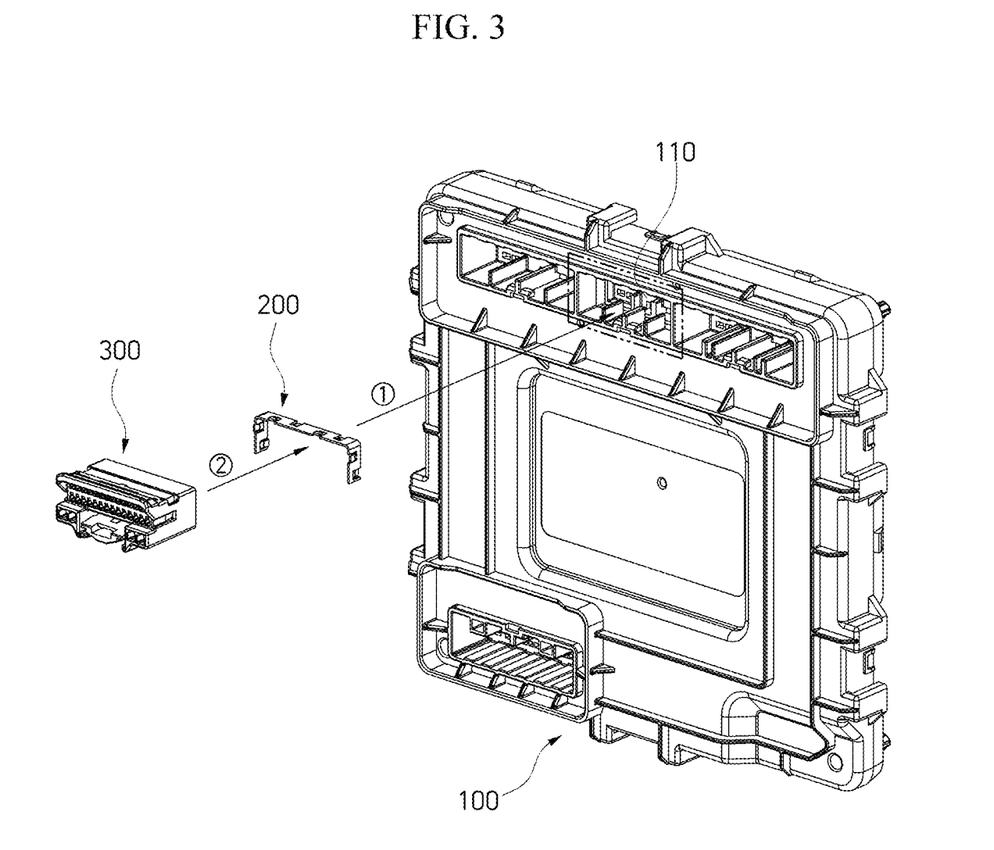
FIG. 3 is a diagram for describing a structure for preventing a connector from being detached from a vehicle electronic component, according to an embodiment of the present invention.

FIG. 3 is an exploded perspective view of an electronic component of a vehicle according to a first embodiment of the present invention.

Referring to FIG. 3, a structure for preventing a female connector from being detached from an electronic component of a vehicle according to the first embodiment of the present invention may include a housing 100 of the electronic component, a fixing clip member 200, and a connector 300 (hereinafter referred to as a female connector).

The housing 100 of the electronic component may include a connector inserting groove 110 into which the female connector 300 is inserted. In the specification, the connector inserting groove 110 may denote a groove where a plurality pins configuring a male connector are provided, and for conciseness of the drawing, the illustration of the plurality of pins are omitted in FIG. 3.

In FIG. 3, '①' and '②' may denote the order of the fixing clip member 200 and the female connector 300 inserted into the connector inserting groove 110.

Also, ① the fixing clip member 200 may be assembled with the connector inserting groove 110, and then, ② the female connector 300 may be assembled with the connector inserting groove 110.

The fixing clip member 200 inserted into and assembled with the connector inserting groove 110 may prevent the female connector 300 from being detached (removed) from the connector inserting groove 110.

Figure 4:
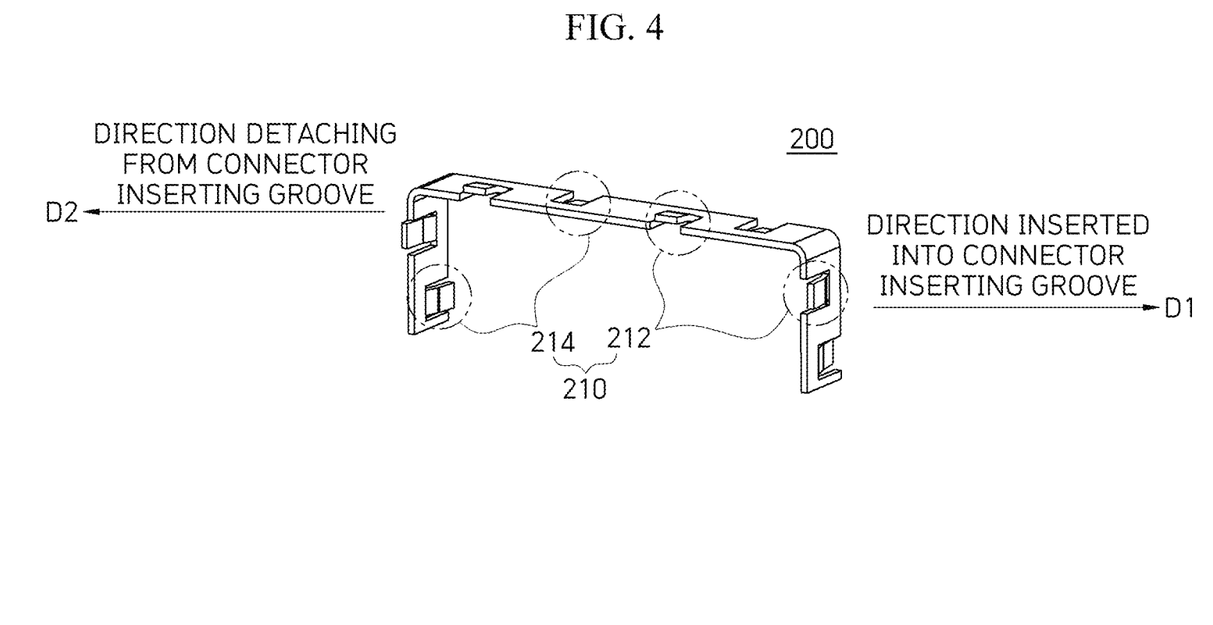
FIG. 4 is an enlarged perspective view of a fixing clip member illustrated in FIG. 3.
Figure 5:
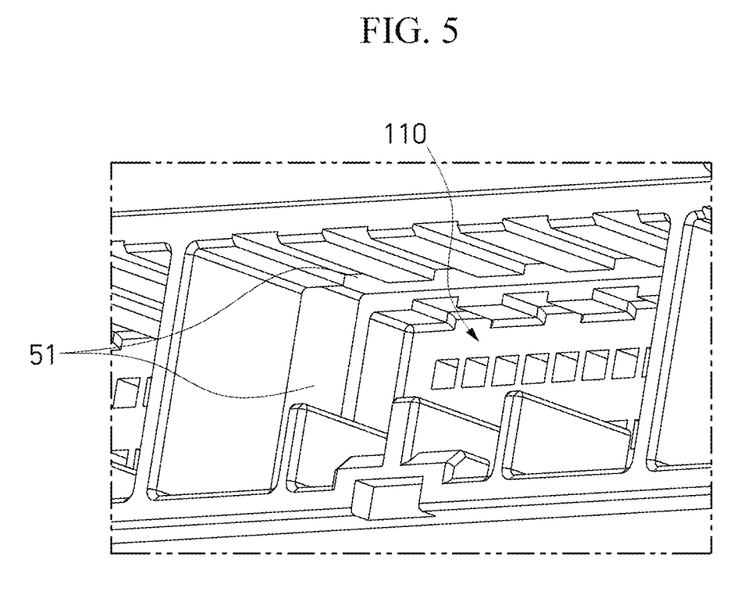
FIG. 5 is an enlarged view of a connector inserting groove illustrated in FIG. 3.
Figure 6:
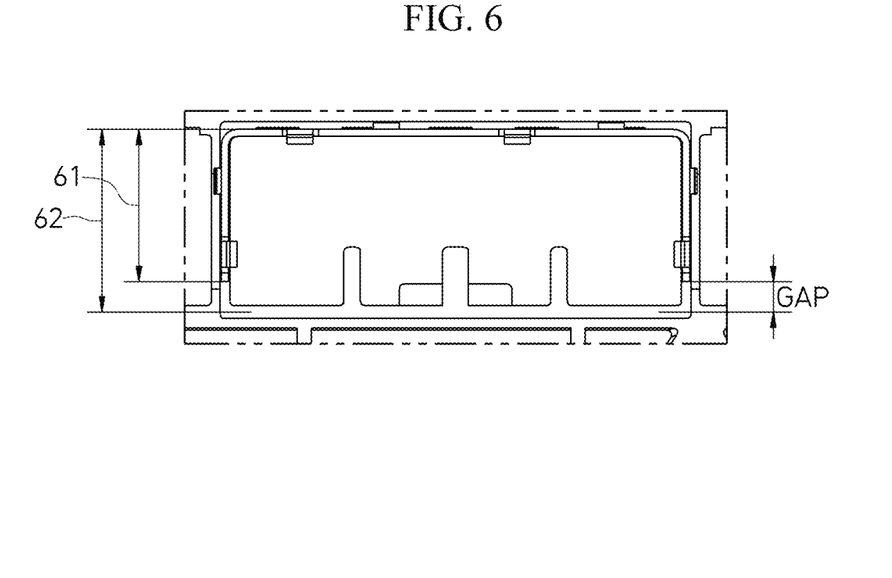
FIG. 6 is a front view when a state, where the fixing clip member illustrated in FIG. 3 is assembled with a connector inserting groove, is seen from the front.

FIG. 4 is an enlarged perspective view of the fixing clip member illustrated in FIG. 3, FIG. 5 is an enlarged view of the connector inserting groove illustrated in FIG. 3, and FIG. 6 is a front view when a state, where the fixing clip member illustrated in FIG. 3 is assembled with the connector inserting groove, is seen from the front.

Referring to FIG. 4, the fixing clip member 200 may be formed (molded) in a ⊏-shape where one side thereof is open.

The fixing clip member 200 may be inserted into the connector inserting groove 110 and may be mounted in and assemble with a mounting groove 51 having a ⊏-shape, which is formed all over both sidewalls and an upper wall forming the connector inserting groove 110 illustrated in FIG. 5.

In order for the fixing clip member 200 to be assembled with the mounting groove 51 illustrated in FIG. 5, the fixing clip member 200 may be formed of an elastic material so that shrunk deformation is well performed in a process of inserting the fixing clip member 200 into the connector inserting groove 110. Here, the elastic material may be a plastic material, but is not limited thereto and may be a metal material.

Moreover, as illustrated in FIG. 6, a gap may be formed between a lengthwise length 61 of the fixing clip member 200 and a length 62 of a groove which is formed in a lengthwise direction in the mounting groove 51 having a ⊏-shape. That is, the lengthwise length 61 of the fixing clip member 200 may be formed to be shorter than the length 62 of the groove which is formed in the lengthwise direction in the mounting groove 51, and thus, the deformation of the fixing clip member 200 may be more easily performed.

As described above, the fixing clip member 200 may have a ⊏-shape where one side thereof is open and the lengthwise length 61 of the fixing clip member 200 may be formed to be shorter than the length 62 of the groove which is formed in the lengthwise direction in the mounting groove 51, and thus, the fixing clip member 200 may be easily shrunk in a process of inserting and mounting the fixing clip member 200 into and in the connector inserting groove (51 of FIG. 5).

Referring again to FIG. 4, the fixing clip member 200 may include a stopper 210 which is detached from the mounting groove 51 having a ⊏-shape illustrated in FIG. 5, or prevents the female connector (300 of FIG. 3) from being detached from the fixing clip member 200 after being assembled with the fixing clip member 200 mounted in the mounting groove 51.

The stopper 210 may have a structure where a portion of the fixing clip member 200 is cut.

The stopper 210 may include a first stopper 212 and a second stopper 214.

The first stopper 212 may be arranged in a lengthwise direction of the fixing clip member 200 at one end portion of the fixing clip member 200, and the second stopper 214 may be arranged in a lengthwise direction of the fixing clip member 200 at the other end portion of the fixing clip member 200. In this case, the first stopper 212 and the second stopper 214 may be alternately formed.

The first stopper 212 may have a shape where a portion of the one end portion of the fixing clip member 200 is cut, and the cut portion may protrude to be inclined in an upward direction of the fixing clip member 200.

On the other hand, the second stopper 214 may have a shape where a portion of an opposite end portion of the fixing clip member 200 is cut, and the cut portion may protrude to be inclined in a downward direction of the fixing clip member 200.

The first stopper 212 may act as a hanging jaw which fixes the fixing clip member 200 so that the fixing clip member 200 is not detached from the mounting groove (51 of FIG. 5) formed in the connector inserting groove 110.

The second stopper 214 may act as a hanging jaw which fixes the female connector 300 inserted into the connector inserting groove 110 so as not to be detached from therefrom in a direction D2 in a state where the female connector 300 is fastened to the fixing clip member 200.

Figure 7:
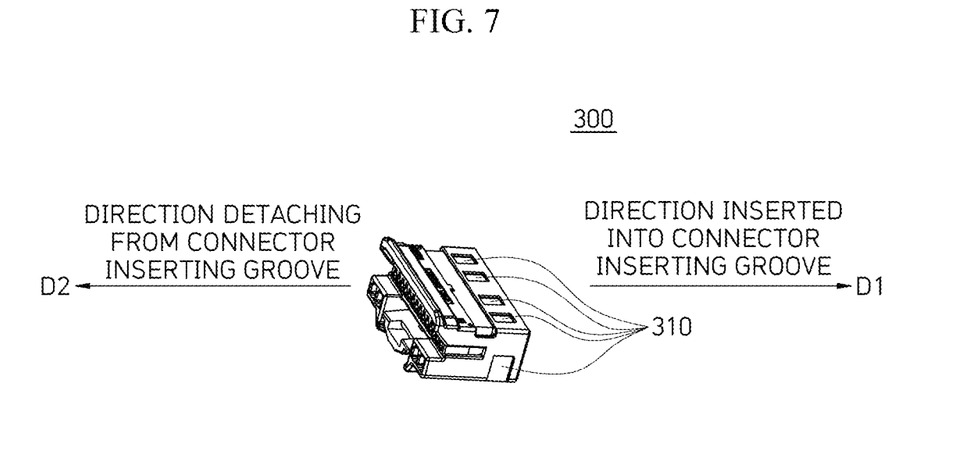
FIG. 7 is an enlarged view of a female connector illustrated in FIG. 3 and is a diagram for describing a stopper hanging groove formed in a front end portion of a female connector so as to be fastened to a second stopper illustrated in FIG. 4.

FIG. 7 is an enlarged view of a female connector illustrated in FIG. 3 and is a diagram for describing a stopper hanging groove formed in a front end portion of a female connector so as to be fastened to the second stopper illustrated in FIG. 4.

As illustrated in FIG. 7, a plurality of stopper hanging grooves 310, where a plurality of second stoppers 214 are respectively mounted along with the arrangement of the second stoppers 214 of the fixing clip member 200, may be formed in a top surface and a side surface of a front end portion of the female connector 300.

The stopper hanging jaws 310 may be arranged in a ⊏-shape all over the top surface and the side surface of the front end portion of the female connector 300.

When the second stopper 214 protruding from a bottom surface of the fixing clip member 200 is mounted in a corresponding stopper hanging groove 310 by sufficiently inserting the female connector 300 into the connector inserting groove 110, the second stopper 214 may act as a hanging jaw which prevents the female connector 300 from being detached therefrom in a direction opposite to a direction in which the female connector 300 is inserted into the connector inserting groove.

As described above, the second stopper 214 of the fixing clip member 200 may act as a hanging jaw so that the female connector 300 is not detached from the connector inserting groove 110, and thus, a vehicle thief may not detach the female connector 300 from the connector inserting groove 110.

Figure 8A:
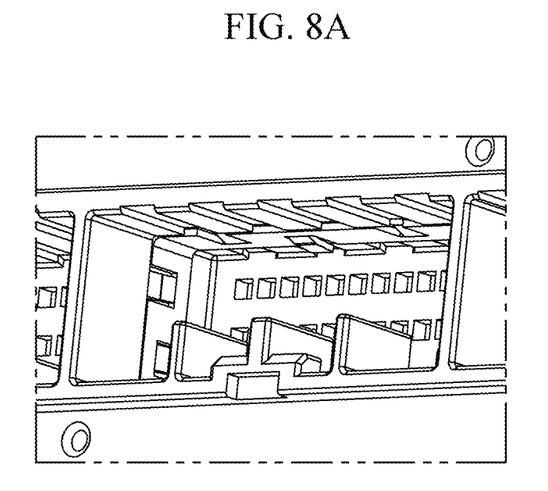
FIGS. 8A to 8C are diagrams for describing a structure where a fixing clip member illustrated in FIG. 4 is fastened to an inner portion of a connector inserting groove.
Figure 8B:
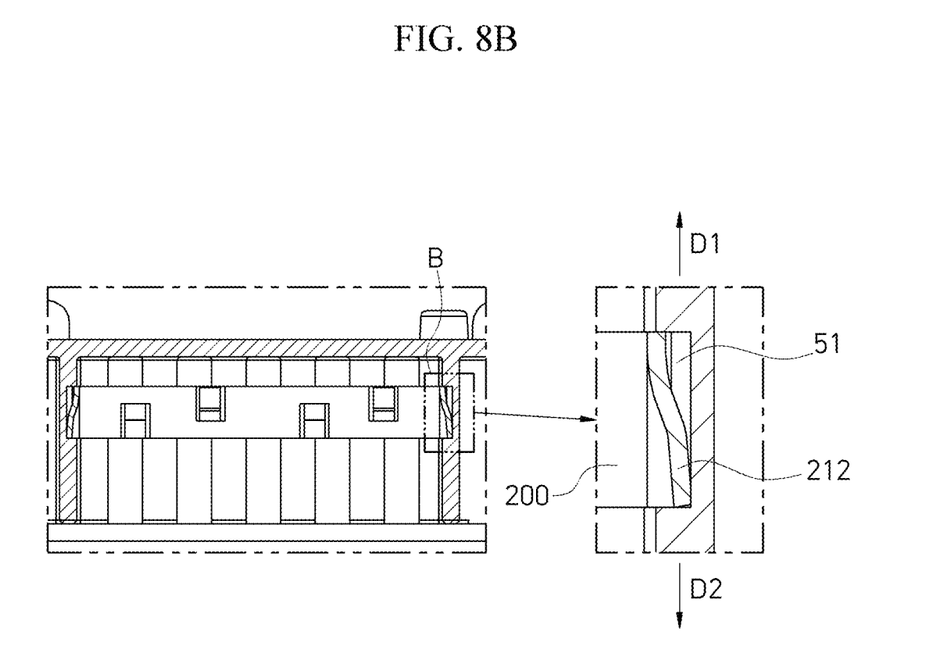

FIGS. 8A and 8B are diagrams for describing a structure where the fixing clip member illustrated in FIG. 4 is fastened to an inner portion of a connector inserting groove.

FIG. 8A is a diagram illustrating an example where a fixing clip member is mounted in a mounting groove of a connector inserting groove.

Figure 8C:
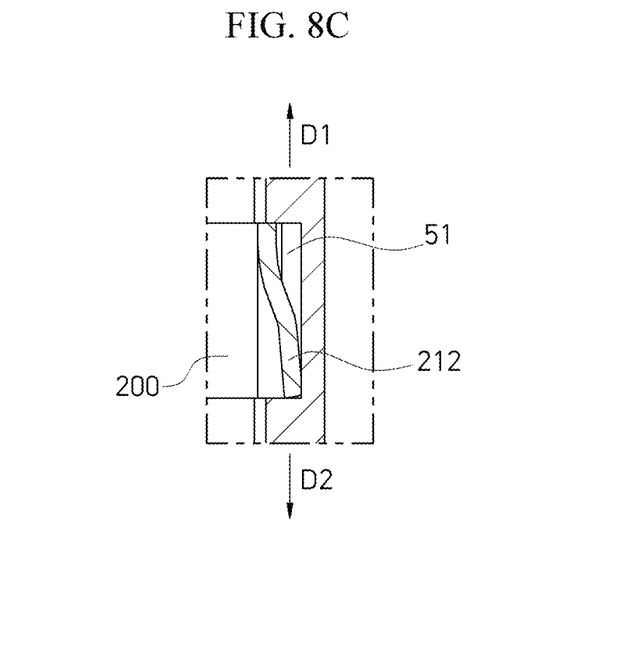

FIG. 8B illustrates a shape as FIG. 8A is seen from above, and FIG. 8C illustrates the enlargement of a portion B of FIG. 8B and is a diagram illustrating an example where the first stopper 212 is mounted in the mounting groove 51 and acts as a hanging jaw.

As illustrated in FIG. 8C, when the first stopper 212 of the fixing clip member 212 is mounted in the mounting groove, the first stopper 212 may act as a hanging jaw so that the female connector 300 is detached therefrom in the direction D2.

Figure 9A:
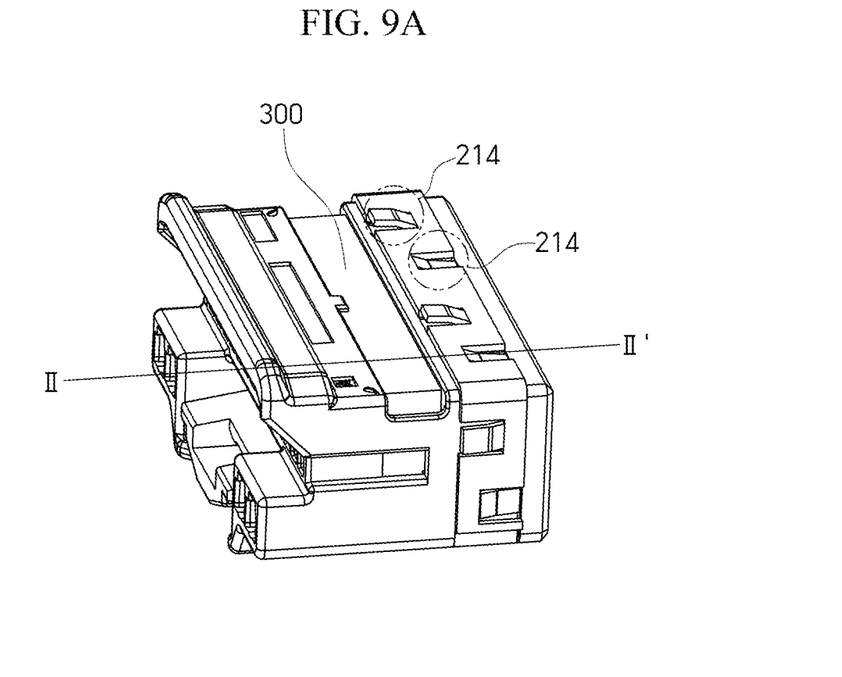
FIGS. 9A and 9B are diagrams illustrating a fastening structure between the fixing clip member illustrated in FIG. 4 and a female connector.
Figure 9B:
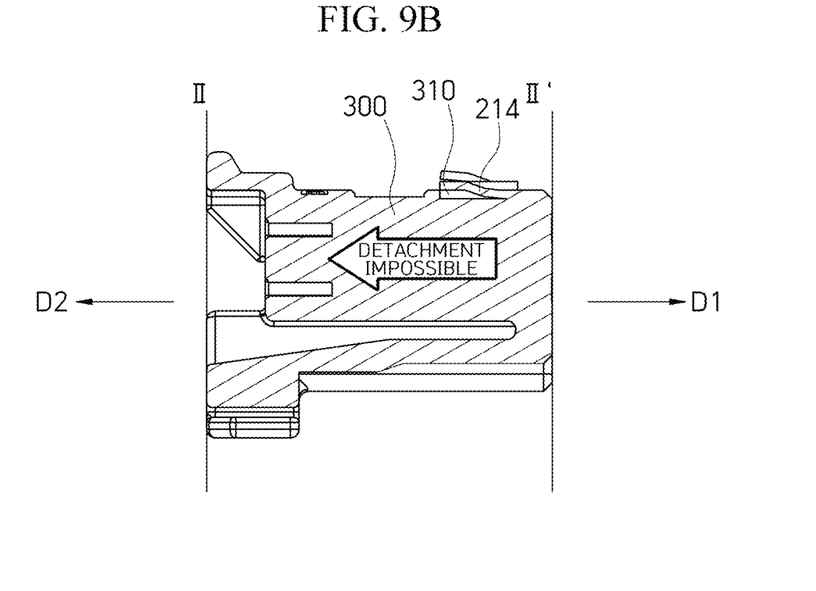

FIGS. 9A and 9B are diagrams illustrating a fastening structure between the fixing clip member illustrated in FIG. 4 and a female connector.

FIG. 9A illustrates a fastening structure between the female connector and the fixing clip member in a state where the fixing clip member is fastened to the mounting groove formed in the connector inserting groove 100 illustrated in FIG. 5, and in order to help understanding, the illustration of the housing 100 of the electronic component is omitted.

FIG. 9B is a cross-sectional view taken along line II-II' of FIG. 9A.

As illustrated in FIG. 9B, in a case where the second stopper 214 is mounted in the stopper hanging jaw 310 formed in the front end portion of the female connector by inserting the female connector 300 into the connector inserting groove, the second stopper 214 may strongly prevent the female connector 300 from being detached from the connector inserting groove 110 even when a thief attempts to detach the female connector 300 from being detached therefrom in the direction D2.

Second Embodiment

Figure 10:
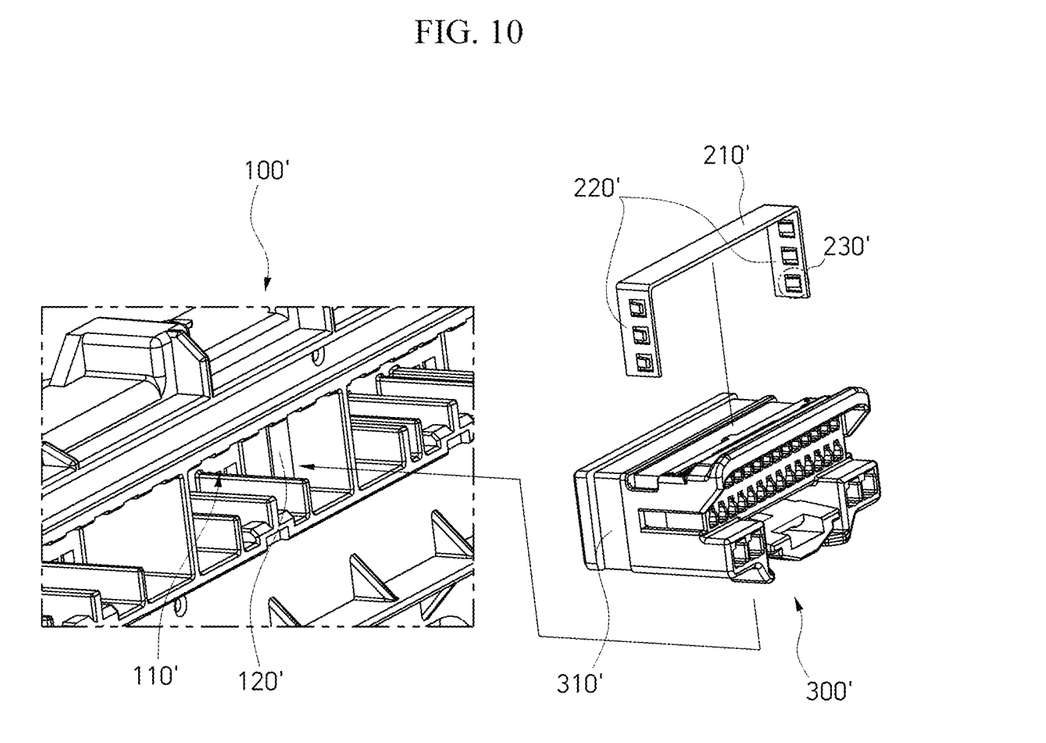
FIG. 10 is an exploded perspective view of an electronic component of a vehicle according to a second embodiment of the present invention.
Figure 11:
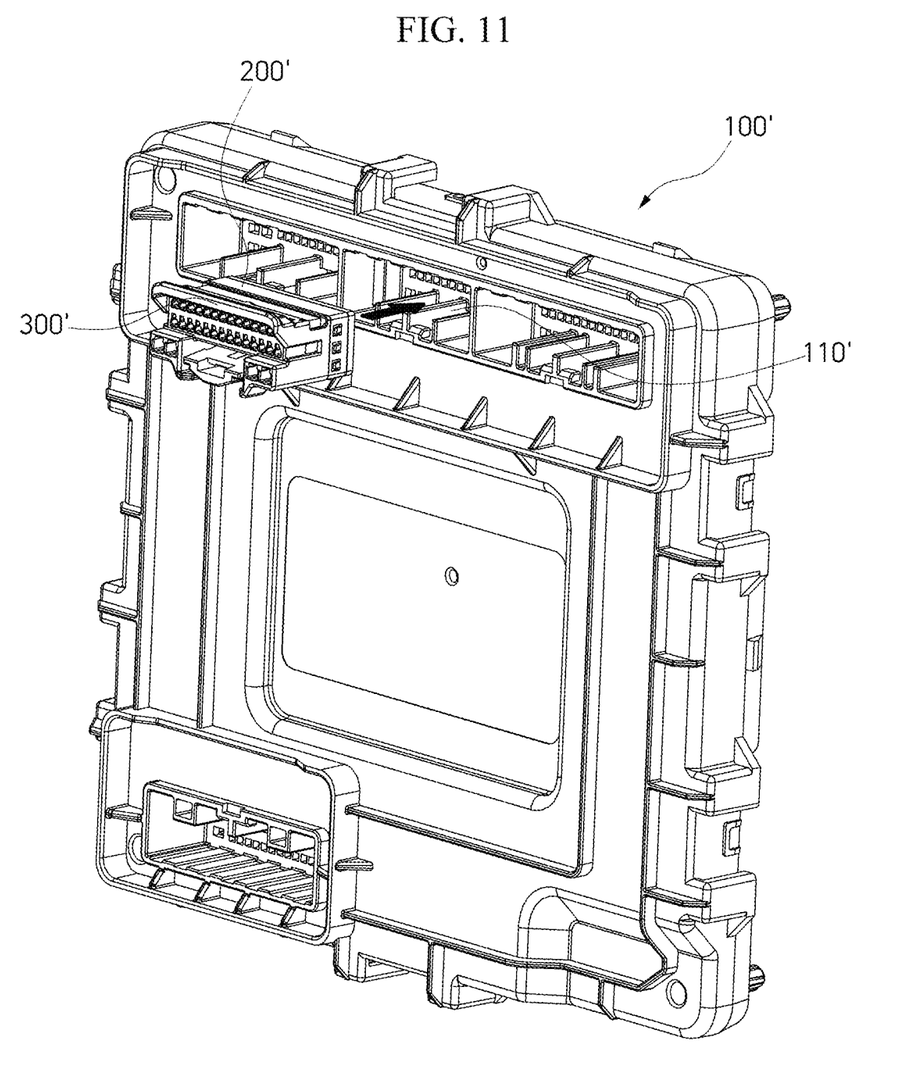
FIG. 11 is a diagram illustrating an example where a fixing clip member illustrated in FIG. 10 is inserted into a connector inserting groove of an electronic component in a state which is fastened to a female connector.

FIG. 10 is an exploded perspective view of an electronic component of a vehicle according to a second embodiment of the present invention. FIG. 11 is a diagram illustrating an example where the fixing clip member illustrated in FIG. 10 is inserted into a connector inserting groove of an electronic component in a state which is fastened to a female connector.

Referring to FIG. 10, a structure for preventing the female connector from being detached from an electronic component of a vehicle according to the second embodiment of the present invention may include a housing 100' of the electronic component, a fixing clip member 200', and a female connector 300'.

In the structure according to the second embodiment of the present invention, as illustrated in FIG. 11, the fixing clip member 200' may be assembled with a front end portion of the female connector 300', and then, may be inserted into a connector inserting groove 110' formed in the housing 100'. In this regard, the structure according to the second embodiment of the present invention may have a difference with the structure according to the first embodiment of the present invention where the fixing clip member 200 is first assembled with an inner portion of the connector inserting groove 110, and then, the female connector 300 is inserted into the connector inserting groove 100.

In order for the fixing clip member 200' to be inserted into the connector inserting groove 110' in a state which is assembled with the female connector 300', the female connector 300' may be formed to include a mounting groove 310' with the fixing clip member 200' mounted thereon.

The mounting groove 310' may be formed in a front end portion of the female connector 300' and may be formed all over a top surface and a side surface of the front end portion of the female connector 300'. That is, the mounting groove 310' may be formed in a ⊏-shape.

The fixing clip member 200' may be formed to have a ⊏-shape so as to be mounted in (assembled with) the ⊏-shaped mounting groove 310' formed in the front end portion of the female connector 300'.

The fixing clip member 200' may include a horizontal member 210' extending in a widthwise direction and a vertical member 220' extending in a lengthwise direction from a both end portion of the horizontal member 210'.

A plurality of stoppers 230' may be arranged in the vertical member 220'.

Each of the plurality of stoppers 230' may have a shape where a portion of the vertical member 220' is cut and may have a shape which protrudes to be inclined in an upward direction from a top surface of the vertical member 220'.

Each of the stoppers 230' may act as a hanging jaw so that the female connector 300' is not detached from the connector inserting groove 110'.

In order for the plurality of stoppers 230' to perform a function of a hanging jaw, a stopper hanging groove 120' extending rectilinearly (a lengthwise direction or a vertical direction) may be formed (molded) in a direction in which the plurality of stoppers 230' are arranged in both sidewalls where the connector inserting groove 110' of the housing 100' of the electronic component.

When the front end portion of the female connector 300' fastened to the fixing clip member 220' is inserted up to the stopper hanging groove 120' of the connector inserting groove 110', the plurality of stoppers 230' formed in the vertical member 220' of the fixing clip member 220' may be mounted in the stopper hanging groove 120'.

The plurality of stoppers 230' mounted in the stopper hanging groove 120' may each act as a hanging jaw so that the female connector 300' is prevented from being detached therefrom in a direction opposite to a direction in which the female connector 300' is inserted into the connector inserting groove 110'.

FIGS. 12A to 12D are diagrams illustrating a fastening structure between a connector inserting groove and a fixing clip member fastened to the female connector illustrated in FIG. 10.

Figure 12A:
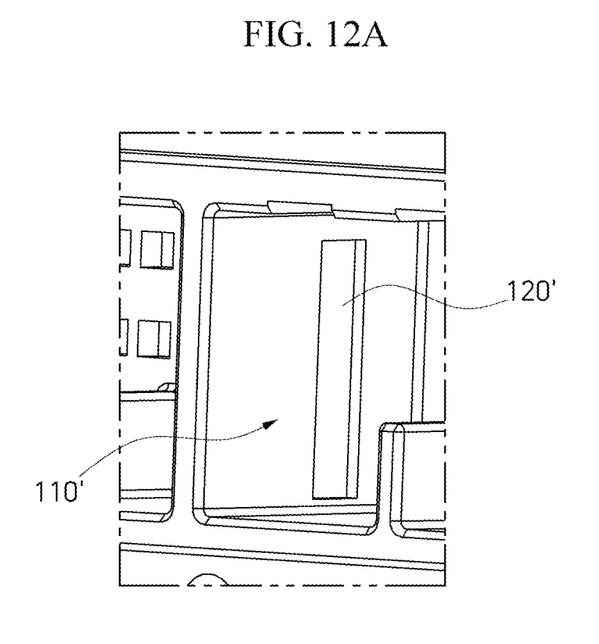
FIGS. 12A to 12D are diagrams illustrating a fastening structure between a connector inserting groove and a fixing clip member fastened to a female connector illustrated in FIG. 10.
Figure 12B:
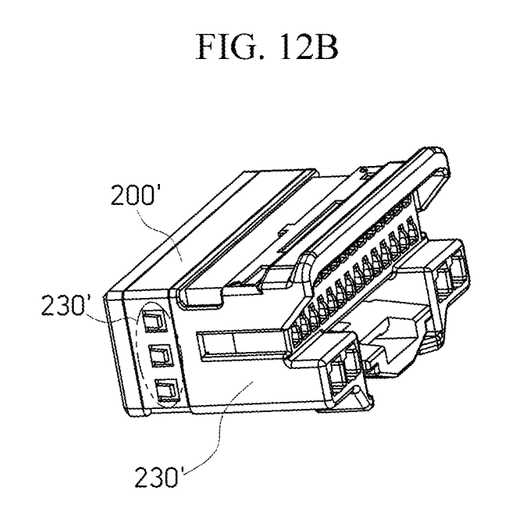
Figure 12C:
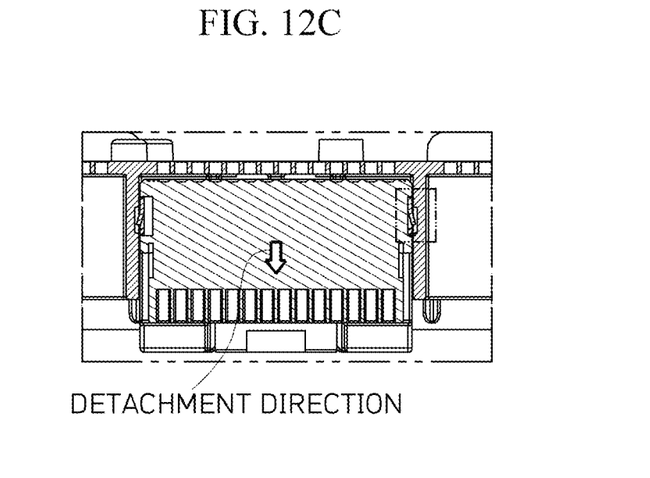

In FIG. 12A illustrates the enlargement of the stopper hanging groove 310 illustrated in FIG. 10, FIG. 12B illustrates a portion of the fixing clip member 200' fastened to the female connector 300', and FIG. 12C is a diagram when a fastening structure between the fixing clip member 200' fastened to the female connector 300' and the stopper hanging groove 120' illustrated in FIG. 12A is seen from above. Also, in FIG. 12D illustrates the enlargement of a yellow dotted-line box portion illustrated in FIG. 12C.

Figure 12D:
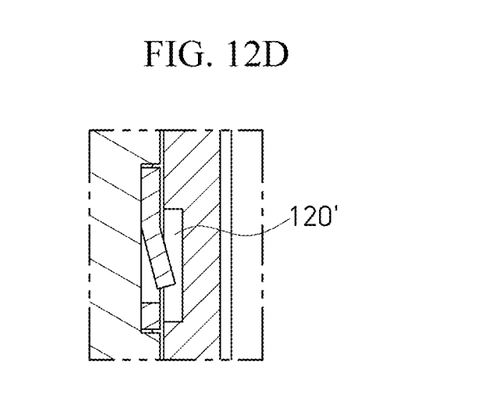

As in FIGS. 12C and 12D, when the plurality of stoppers 230' formed in a vertical member of the fixing clip member 300' are mounted in the stopper hanging groove 120' of the connector inserting groove 110', each of the plurality of stoppers 230' may act as a hanging jaw so that the female connector 300' fastened to the fixing clip member 200' is not detached from the connector inserting groove 110'. Accordingly, the present invention may prevent a thief from illegally detaching the female connector 300' from the connector inserting groove 110'.

According to the embodiments of the present invention, in a case where a thief attempts to detach a connector from an electronic component (for example, a component associated with the start of a vehicle engine), a fixing clip member may perform a supporting function (a hanging jaw function) so that a female connector is not detached from a connection inserting groove, thereby preventing vehicle theft.

Moreover, according to the embodiments of the present invention, unlike the related art, a safety bracket for preventing a connector from a vehicle electronic component may not be mounted on a mounting bracket, and by using only the fixing clip member which is compact, the female connector may be prevented from being detached from the connector inserting groove. Accordingly, it may not be required to manufacture a new mold for manufacturing the safety bracket on the basis of the modification of the mounting bracket every time.

Moreover, according to the embodiments of the present invention, it may not be required to manufacture a new mold for manufacturing the safety bracket on the basis of the modification of the mounting bracket, and a separate component for mounting the safety bracket on the mounting bracket may not be needed. Accordingly, the cost may decrease, the cost for manufacturing a new mold may be reduced, and a cycle time based thereon may be considerably reduced.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A structure configured to prevent a connector from being detached from an electronic component of a vehicle, the structure comprising:
   a fixing clip member configured to fix the connector to a connector inserting groove, wherein the fixing clip member has a c-shape where one side thereof is open, wherein the fixing clip member comprises:
   a first stopper mounted in a mounting groove formed in the connector inserting groove, the first stopper acting as a hanging jaw that keeps the fixing clip member attached to the connector inserting groove in a process of inserting the fixing clip member into the connector inserting groove, wherein the mounting groove has a c-shape formed over both sidewalls and an upper wall forming the connector inserting groove so that the fixing clip member having the c-shape is mounted therein; and
   a second stopper mounted in a stopper hanging groove formed in a front end portion of the connector, the second stopper acting as a hanging jaw that keeps the connector attached to the connector inserting groove in a process of inserting the connector into the connector inserting groove.

2. The structure of claim 1, wherein
   a cut portion of one end portion of the fixing clip member protrudes to be inclined in an upward direction of the fixing clip member, and
   a cut portion of an opposite end portion of the fixing clip member protrudes to be inclined in a downward direction of the fixing clip member.

3. The structure of claim 1, wherein the first and second stoppers are alternately formed in a lengthwise direction of the fixing clip member.

4. The structure of claim 1, wherein
   the second stopper is provided in plurality,
   the stopper hanging groove formed in the front end portion of the connector is provided in plurality over a top surface and a side surface of the front end portion of the connector, and
   the plurality of second stoppers are respectively mounted in the plurality of stopper hanging grooves.

* * * * *